United States Patent
Scharp et al.

(10) Patent No.: US 8,544,442 B2
(45) Date of Patent: *Oct. 1, 2013

(54) MULTI-PART PISTON FOR AN INTERNAL COMBUSTION ENGINE AND METHOD FOR ITS PRODUCTION

(75) Inventors: Rainer Scharp, Vaihingen (DE); Klaus Keller, Lorch (DE); Volker Weisse, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,034

(22) Filed: Feb. 29, 2012

(65) Prior Publication Data
US 2012/0151766 A1    Jun. 21, 2012

Related U.S. Application Data

(62) Division of application No. 12/381,842, filed on Mar. 17, 2009, now Pat. No. 8,161,934.

(30) Foreign Application Priority Data

Nov. 5, 2008 (DE) .......................... 10 2008 055 910

(51) Int. Cl.
*B23P 15/10* (2006.01)
*F02F 3/22* (2006.01)

(52) U.S. Cl.
USPC ................................. 123/193.6; 123/41.35

(58) Field of Classification Search
USPC ............ 92/186, 216–259; 123/193.6, 41.35; 29/888.044, 888.042
See application file for complete search history.

(56) References Cited

U.S. PATENT DOCUMENTS

| | | | |
|---|---|---|---|
| 6,453,797 B1 * | 9/2002 | Bauer | 92/186 |
| 6,557,514 B1 | 5/2003 | Gaiser | |
| 7,934,482 B2 | 5/2011 | Messmer | |
| 8,161,934 B2 * | 4/2012 | Scharp et al. | 123/193.6 |
| 2007/0079775 A1 * | 4/2007 | Lin et al. | 123/41.35 |
| 2010/0107868 A1 | 5/2010 | Scharp et al. | |
| 2010/0107998 A1 * | 5/2010 | Scharp et al. | 123/41.35 |
| 2010/0108000 A1 | 5/2010 | Scharp et al. | |
| 2010/0108001 A1 | 5/2010 | Scharp et al. | |
| 2010/0108015 A1 | 5/2010 | Scharp | |
| 2010/0108016 A1 | 5/2010 | Scharp et al. | |

FOREIGN PATENT DOCUMENTS

EP    1 222 364    7/2002

* cited by examiner

*Primary Examiner* — M. McMahon
(74) *Attorney, Agent, or Firm* — Collard & Roe, P.C.

(57) ABSTRACT

A method for the production of a multi-part piston for an internal combustion engine involves producing an upper piston part having a piston crown as well as an inner and an outer support element, and producing a lower piston part having a skirt and having pin boss supports and pin bosses connected with the pin boss supports, and an inner and an outer support element. A separate cooling oil collector having at least one cooling oil opening is inserted into the upper piston part or the lower piston part. The upper piston part and the lower piston part are connected in such a manner that the inner and outer support elements of the upper and lower piston parts, delimit an outer circumferential cooling channel and a cavity that is open toward the pin bosses and provided with the cooling oil collector.

5 Claims, 1 Drawing Sheet

MULTI-PART PISTON FOR AN INTERNAL COMBUSTION ENGINE AND METHOD FOR ITS PRODUCTION

CROSS REFERENCE TO RELATED APPLICATIONS

This is a divisional of U.S. patent application Ser. No. 12/381,842, filed on Mar. 17, 2009, which claims priority under 35 U.S.C. §119 of German Application No. 10 2008 055 910.5 filed Nov. 5, 2008.

BACKGROUND OF THE INVENTION

1. Field of the Invention

The present invention relates to a multi-part piston for an internal combustion engine, having an upper piston part that has a piston crown, and a lower piston part. The lower piston part has pin boss supports and pin bosses connected with the pin boss supports. The upper piston part and the lower piston part each have an inner and an outer support element, which elements delimit an outer circumferential cooling channel. The present invention furthermore relates to a method for the production of such a piston.

2. The Prior Art

A multi-part piston is disclosed, for example, in European Patent No. EP 1 222 364 B1. This piston has an outer circumferential cooling channel and an inner cooling chamber whose cooling chamber bottom is provided with an opening. This opening allows cooling oil to flow away out of the inner cooling chamber in the direction of the piston crown, in order to lubricate the piston pin and to intensify the cooling effect by effective cooling oil circulation. In order to achieve this goal, the opening in the cooling chamber bottom cannot be too large, because then, the cooling oil would no longer flow away in a metered manner, and effective cooling oil circulation would thereby be impaired. This means that the cooling chamber bottom is configured essentially as a relatively wide and thin circumferential ring land that extends approximately in the radial direction, in the upper region of the lower piston part. However, such a structure is difficult to produce. In the case of a forged lower piston part, in particular, there is the additional problem that when using a forging method, only a very thick and heavy cooling chamber bottom can be produced, due to forging tolerances and production restrictions.

SUMMARY OF THE INVENTION

It is therefore an object of the invention to provide a multi-part piston as well as a method for its production, which guarantees a good cooling effect of the cooling oil as well as effective lubrication of the piston pin, and is simple to produce as a light piston or a forged piston.

This object is accomplished according to the invention by a multi-part piston for an internal combustion engine, having an upper piston part having a piston crown, and a lower piston part with a piston skirt and pin boss supports with pin bosses connected with them. The upper piston part and the lower piston part each have an inner and an outer support element, which elements delimit an outer circumferential cooling channel.

According to the invention, the inner support elements delimit a cavity that is open toward the pin bosses, and that the cavity is provided with a separate cooling oil collector that has at least one cooling oil opening.

The method according to the invention is characterized by the following method steps: producing an upper piston part having a piston crown as well as an inner and an outer support element, producing a lower piston part having pin boss supports and pin bosses connected with them, as an inner and an outer support element; inserting a separate cooling oil collector, having at least one cooling oil opening, into the upper piston part or the lower piston part, in the region of their inner support elements; connecting the upper piston part and the lower piston part in such a manner that the inner and outer support elements delimit an outer circumferential cooling channel and a cavity that is open toward the pin bosses and provided with the cooling oil collector.

According to the invention, an inner cooling chamber and thus a cooling chamber bottom in the piston are therefore eliminated. The problem of producing a circumferential ring land that extends approximately in the radial direction, as a relatively wide and thin region, is therefore completely eliminated. The upper piston part and the lower piston part of the piston according to the invention can therefore also be produced as forged parts, in a relatively simple manner, and as comparatively light components.

The piston according to the invention and the production method according to the invention are thus also characterized by clearly improved economic efficiency. The cooling oil collector optimizes the cooling effect of the cooling oil, particularly below the piston crown. The at least one cooling oil opening in the cooling oil collector also allows significantly better and more precise metering of the cooling oil that flows away in the direction of the piston pin, so that the lubrication of the piston pin is also improved, as compared with the pistons known in the state of the art. Since the cooling oil collector can be produced and installed as a very simply structured and light component, the economic efficiency of the piston according to the invention, and of the production method according to the invention, remains unimpaired.

In a preferred embodiment of the piston according to the invention, the upper piston part and the lower piston part are connected with one another by a friction welding method that produces a friction weld bead, at least by way of their inner support elements, and the cooling oil collector is held between the friction weld beads and pin boss supports. Alternatively to this, the cooling oil collector can also be held between the friction weld beads and the underside of the piston crown.

Positioning of the cooling oil collector in the cavity can thus be selected as desired, and can take place both above and below the friction weld bead, depending on the requirements of an individual case. The friction weld beads furthermore ensure secure axial support of the cooling oil collector.

It is practical if the cooling oil collector is configured, at least in part, as a spring-elastic component, so that it can be held in one of the two components before the upper piston part and the lower piston part are connected, under spring bias.

A possible configuration of such a cooling oil collector consists in the fact that the cooling oil collector has a spring-elastic flange or at least two elastic spring tongues disposed on the outer edge. If spring tongues are used, the slits that delimit the spring tongues can serve as cooling oil openings, at the same time. In the simplest case, the cooling oil collector has an essentially round shape and can be provided with a slight curvature.

The cooling oil collector preferably has two or more cooling oil openings, so that a very precisely metered amount of cooling oil can flow away out of the cavity, in the direction of the piston crown. The cooling oil collector can be produced from any desired material. For example, a spring steel sheet has proven to be well suited.

The at least one cooling oil opening in the cooling oil collector can be configured as a usual, round opening, or, for example, also as a slit that is disposed at the edge of the cooling oil collector or extends inward from the edge of the cooling oil collector.

The upper piston part and/or the lower piston part can be cast parts or forged parts, and can be produced, for example, from a steel material, particularly forged.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE EMBODIMENT

Figures 1, 2:
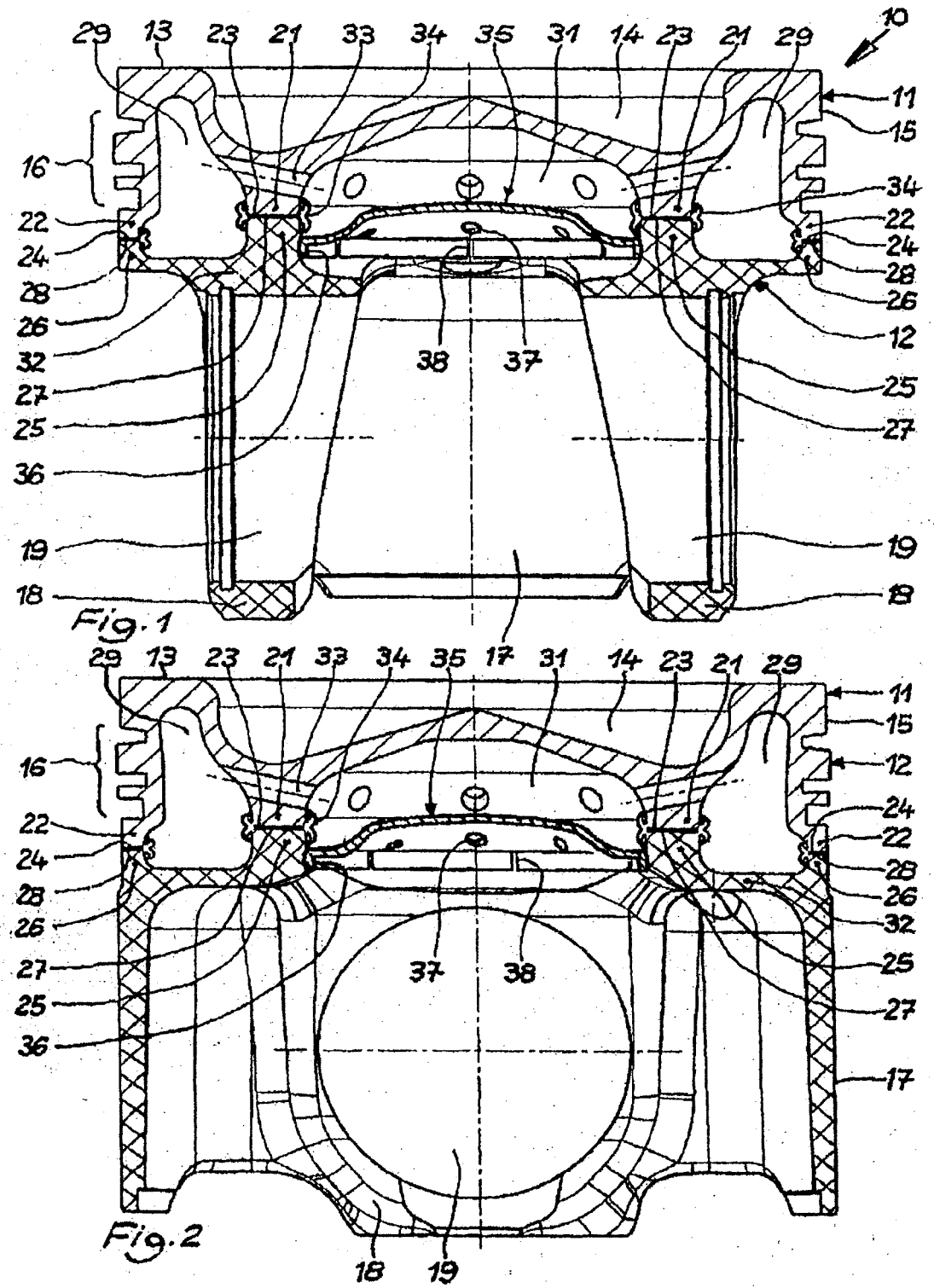
FIG. 1 is a section through an exemplary embodiment of a piston according to the invention.
FIG. 2 shows the piston according to FIG. 1 in section, whereby the representation is rotated by 90° as compared with FIG. 1.

FIGS. 1 and 2 show an exemplary embodiment of a piston 10 according to the invention. Piston 10 according to the invention is composed of an upper piston part 11 and a lower piston part 12, which, in the embodiment shown here, are forged from a steel material. Upper piston part 11 has a piston crown 13 having a combustion bowl 14, as well as a circumferential top land 15 and a circumferential ring belt 16. Lower piston part 12 has a piston skirt 17 and pin bosses 18 having pin bores 19, for accommodating a piston pin (not shown).

Upper piston part 11 has an inner support element 21 and an outer support element 22. Inner support element 21 is disposed on the underside of piston crown 13, circumferentially, in ring shape, and has a joining surface 23. Outer support element 22 of upper piston part 11 is formed below ring belt 16, and has a joining surface 24.

Lower piston part 12 also has an inner support element 25 and an outer support element 26. Inner support element 25 is disposed on the top of lower piston part 12, circumferentially, and has a joining surface 27. Outer support element 26 is formed as an extension of piston skirt 17 in the embodiment shown, and has a joining surface 28. Pin boss supports 32 for connecting pin bosses 18 are provided below inner support element 25 of lower piston part 12.

Upper piston part 11 and lower piston part 12 are joined, in known manner, by means of a friction welding method, so that joining surfaces 23 and 27, and 24 and 28, respectively, are connected with one another.

Upper piston part 11 and lower piston part 12 form an outer circumferential cooling channel 29. In this connection, ring belt 16 and outer support element 22 of upper piston part 11 as well as outer support element 26 of lower piston part 12 delimit outer cooling channel 29 toward the outside. Inner support element 21 of the upper piston part and inner support element 25 of the lower piston part delimit outer cooling channel 29 toward the piston interior. Inner support element 21 of the upper piston part and inner support element 25 of the lower piston part furthermore delimit a cavity 31 that is open toward pin bosses 18, which cavity is disposed essentially below piston crown 13.

In the exemplary embodiment, cooling oil channels 33 are provided in inner support element 21 of upper piston part 11, which connect outer cooling channel 29 with cavity 31. In the embodiment shown, cooling oil channels 33 run at an angle downward, in the direction of cavity 31, proceeding from outer cooling channel 29. Of course, cooling oil channels 33 can also be disposed in inner support element 25 of lower piston part 12, and/or can run at an angle upward, in the direction of cavity 31, proceeding from outer cooling channel 29.

As a result of the friction welding process for connecting upper piston part 11 and lower piston part 12, friction weld beads 34 project both into cavity 31 and into outer cooling channel 29.

Cavity 31 is provided with a cooling oil collector 35. In the embodiment shown, cooling oil collector 35 is produced from a spring steel sheet, has an essentially round shape, is provided with a slight curvature, approximately in the shape of a flattened dome, and has a thickness of approximately 0.8 mm. It has a circumferential spring-elastic flange 36 and cooling oil openings 37. In the embodiment shown, flange 36 is provided with slits 38 that both increase the elasticity of the flange 36 in the radial direction and also serve as additional cooling oil openings. In the embodiment shown, cooling oil collector 35 is held between pin boss supports 32 and friction weld bead 34, in the region of lower piston part 12, and supports itself on pin boss supports 32 in the direction of pin bosses 18, and on friction weld beads 34 in the direction of upper piston part 11. In the embodiment shown, cooling oil collector 35 is disposed in such a manner that its curvature is directed toward upper piston part 11. Depending on the placement of cooling oil collector 35 in cavity 31, the curvature can also be directed toward pin bosses 18.

Of course, cooling oil collector 35 can also be disposed in the region of upper piston part 11, so that it supports itself on friction weld beads 34 and in the region of the underside of piston crown 13. In this case, it is practical to dispose cooling oil channels 33 in inner support element 25 of upper piston part 11.

Cooling oil collector 35 serves to collect the cooling oil that passes through cooling oil channels 33, out of outer cooling channel 29, into cavity 31, and to guide it in the direction of the underside of piston crown 13, particularly by means of the shaker effect that occurs during operation, in order to increase the cooling effect in this region. Cooling oil openings 37 make it possible to guide a defined amount of cooling oil in the direction of the piston pin (not shown) accommodated in pin bores 19, in order to improve its lubrication.

Furthermore, after prior cleaning and degreasing of the surfaces, flange region 36 of cooling oil collector 35 can be provided with a layer of solder tin, for example a copper/tin solder or silver solder (AgSn), applied in a layer thickness of 100-500 μm, using dabber printing or screen printing, or by means of immersion in a solder bath.

For assembly of piston 10 according to the invention, first upper piston part 11, lower piston part 12, and cooling oil collector 35 are produced as separate components. In the exemplary embodiment, cooling oil collector 35 is inserted into lower piston part 12, in the region of the inner circumferential support element 25, and held there under spring bias, with force fit and/or shape fit. Subsequently, upper piston part 11 and lower piston part 12 are connected with one another, by means of a friction welding process, by way of joining surfaces 23, 27 and 24, 28, respectively, in such a manner that cooling oil collector 35 supports itself and is held both on the friction weld bead 34 that has formed and on pin boss supports 32.

Once the flange region of cooling oil collector 35 has been provided with solder paste, melting of the solder paste takes place by means of the heat that results from the friction welding process so that additional locking in place of the cooling oil collector on the corresponding piston part (11, 12) that is used, depending on the embodiment, takes place.

The inner cooling chamber with the cooling chamber bottom in the form of a wide, radially circumferential ring land, which is required in the state of the art, has therefore been eliminated.

Accordingly, while only a few embodiments of the present invention have been shown and described, it is obvious that many changes and modifications may be made thereunto without departing from the spirit and scope of the invention.

What is claimed is:

1. A method for the production of a multi-part piston for an internal combustion engine, comprising the following steps:

producing an upper piston part having a piston crown as well as an inner and an outer support element;

producing a lower piston part having a skirt and having pin boss supports and pin bosses connected with the pin boss supports, and an inner and an outer support element;

inserting a separate cooling oil collector, having at least one cooling oil opening, into the upper piston part or the lower piston part in such a manner that the cooling oil collector is held in the upper piston part or lower piston part under spring bias; and connecting the upper piston part and the lower piston part in such a manner that the inner and outer support elements of the upper and lower piston parts, delimit an outer circumferential cooling channel and a cavity that is open toward the pin bosses and provided with the cooling oil collector;

wherein at least the inner support elements of the upper piston part and the lower piston part are connected with one another by means of a friction welding method that produces a friction weld bead, and wherein the cooling oil collector is held between the friction weld bead and pin boss support.

2. The method according to claim 1, wherein the cooling oil collector is inserted into the upper piston part, in a region of the inner support element, or into the lower piston part, in a region of the inner support element.

3. A method for the production of a multi-part piston for an internal combustion engine, comprising the following steps:

producing an upper piston part having a piston crown as well as an inner and an outer support element;

producing a lower piston part having a skirt and having pin boss supports and pin bosses connected with the pin boss supports, and an inner and an outer support element;

inserting a separate cooling oil collector, having at least one cooling oil opening, into the upper piston part or the lower piston part in such a manner that the cooling oil collector is held in the upper piston part or lower piston part under spring bias; and connecting the upper piston part and the lower piston part in such a manner that the inner and outer support elements of the upper and lower piston parts, delimit an outer circumferential cooling channel and a cavity that is open toward the pin bosses and provided with the cooling oil collector;

wherein at least the inner support elements of the upper piston part and the lower piston part are connected with one another by a friction welding method that produces a friction weld bead, and wherein the cooling oil collector is held between friction weld bead and the underside of the piston crown.

4. A method for the production of a multi-part piston for an internal combustion engine, comprising the following steps:

producing an upper piston part having a piston crown as well as an inner and an outer support element;

producing a lower piston part having a skirt and having pin boss supports and pin bosses connected with the pin boss supports, and an inner and an outer support element;

inserting a separate cooling oil collector, having at least one cooling oil opening, into the upper piston part or the lower piston part in such a manner that the cooling oil collector is held in the upper piston part or lower piston part under spring bias; and connecting the upper piston part and the lower piston part in such a manner that the inner and outer support elements of the upper and lower piston parts, delimit an outer circumferential cooling channel and a cavity that is open toward the pin bosses and provided with the cooling oil collector;

wherein a flange region of the cooling oil collector is provided with a layer of solder tin.

5. A method for the production of a multi-part piston for an internal combustion engine, comprising the following steps:

producing an upper piston part having a piston crown as well as an inner and an outer support element;

producing a lower piston part having a skirt and having pin boss supports and pin bosses connected with the pin boss supports, and an inner and an outer support element;

inserting a separate cooling oil collector, having at least one cooling oil opening, into the upper piston part or the lower piston part in such a manner that the cooling oil collector is held in the upper piston part or lower piston part under spring bias; and connecting the upper piston part and the lower piston part in such a manner that the inner and outer support elements of the upper and lower piston parts, delimit an outer circumferential cooling channel and a cavity that is open toward the pin bosses and provided with the cooling oil collector;

wherein the cooling oil collector is soldered to one of the piston parts, by means of friction heat that occurs during friction welding.

* * * * *